US006595557B2

(12) United States Patent  (10) Patent No.: US 6,595,557 B2
Hignett  (45) Date of Patent: Jul. 22, 2003

(54) SCREW-THREADED PIPE JOINT

(75) Inventor: Ian Harold Hignett, Great Yarmouth (GB)

(73) Assignee: HSC. S.A.L., Beirut (LB)

( * ) Notice: Subject to any disclaimer, the term of this patent is extended or adjusted under 35 U.S.C. 154(b) by 0 days.

(21) Appl. No.: 10/181,251
(22) PCT Filed: Jan. 12, 2001
(86) PCT No.: PCT/GB01/00113
§ 371 (c)(1),
(2), (4) Date: Jul. 12, 2002
(87) PCT Pub. No.: WO01/51840
PCT Pub. Date: Jul. 19, 2001

(65) Prior Publication Data
US 2003/0001388 A1 Jan. 2, 2003

(30) Foreign Application Priority Data
Jan. 13, 2000 (GB) .............................. 0000642
(51) Int. Cl.⁷ ............................... F16L 25/00
(52) U.S. Cl. ................ 285/333; 285/390; 285/355
(58) Field of Search ................. 285/333, 334, 285/355, 390

(56) References Cited
U.S. PATENT DOCUMENTS 2,258,066 A * 10/1941 Oyen .......................... 285/328
2,893,759 A *  7/1959 Blose .......................... 285/334
2,992,019 A *  7/1961 MacArthur ................. 285/110
3,856,337 A * 12/1974 Ehm et al. .................. 285/334
3,880,351 A *  4/1975 Bogart ....................... 235/95 R
4,384,737 A *  5/1983 Reusser ...................... 285/334
4,501,443 A *  2/1985 Haring ....................... 285/328
4,538,840 A *  9/1985 DeLange .................... 285/333
4,623,173 A * 11/1986 Handa et al. ............... 285/333
4,732,416 A *  3/1988 Dearden et al. ............ 285/333
4,958,862 A *  9/1990 Cappelli et al. ............ 285/334
4,984,829 A *  1/1991 Saigo et al. ................ 285/334
5,649,725 A *  7/1997 Nagasaku et al. .......... 285/334

FOREIGN PATENT DOCUMENTS

EP        916883    *  5/1999
GB       1515357    *  6/1978

* cited by examiner

Primary Examiner—Eric K. Nicholson
(74) Attorney, Agent, or Firm—Factor & Partners, LLC

(57) ABSTRACT

A screw-threaded joint for a pipe has a male portion (10) and a female portion (12), having complementary screw threads (11, 13). The male thread (11) extends to a position adjacent a complementary stop shoulder (18) on the female portion (12) having a recess of conical cross-section having a rounded apex. The recess is adapted to receive a head portion having a conical cross-section with a rounded apex, the radius of curvature of which is greater than that of the recess's apex providing a seal with improved stress dispersal properties upon application of torque. The wall (33) of the cone's in-use outwardly facing surface on the male portion (10) can subtend an angle of from 28–36° to the longitudinal axis of the pipe. The corresponding cone wall on the female portion can subtend an angle of from 28–38° with the same axis. The male portion (10) can comprise a second stress dispersing surface (41), concave in shape.

17 Claims, 4 Drawing Sheets

SCREW-THREADED PIPE JOINT

FIELD OF THE INVENTION

The present invention relates to a connection for joining pipes together, in particular to pipes for use underground in, for example, the gas and oil industry.

BACKGROUND OF THE INVENTION

When transporting a fluid, such as oil or natural gas between two locations, the most cost effective methods, where possible utilise pipelines. Such pipelines are normally constructed from individual pipes joined together. The regions where the pipes join, constitute discontinuities in both the inner and outer surface of the pipeline and as such are sources of weakness within the finished pipeline.

It is important that any such weakness is minimised as much as possible, as any loss of fluid from the pipe is both wasteful of resources and potentially disastrous for the environment. Furthermore, the fluid lost can also increase the risk to personnel from fire or explosion. Replacement of inefficient or leaking joints is not always easy. Particularly in the case of the oil and gas industry, pipelines are situated quite often in relatively inaccessible locations and replacement is difficult and expensive.

A number of solutions have been employed to overcome weakness. The most common solution is a screw-threaded joint, the threads of the joint acting together to prevent separation of the individual pipes either axially or radially.

The joints formed must firstly be so constructed that any fluids within the pipe cannot escape. They must also be capable of withstanding large differentials in pressure across the radial width of the joint, which pressure differential usually has a positive component in an outwardly radial direction.

Screw-threaded joints require the engagement of two threaded regions situated one on each of the pipes to be connected together. Engagement is normally by application of a torque. The two threaded regions are normally manufactured so that their threads are complementary to each other.

GB 1 587 836 (VALLOUREC) discloses a screw connection for pipes in which a stop-shoulder on one pipe co-operates with a complementary stop-shoulder on the other pipe to form a seal.

There a number of problems with such a seal. Firstly, the metal from which the stop-shoulders are formed, flows under the high torque applied when screwing the pipes together. Therefore if care is not taken slippage or buckling of the joint can occur. Secondly, the joints formed can comprise a step discontinuity in going from one section of pipe to the other.

It is an object of the present invention to provide a screw-thread connection which addresses the above problems

SUMMARY OF THE INVENTION

According to the present invention there is a provided a screw threaded joint for pipes comprising a first pipe length having at one end a male screw threaded portion and a second pipe length having at one end a female portion having a complementary screw thread, the portions being adapted to inter-engage alone the greater part of the axial length of the threaded portions, the screw threads thereof being inclined in the same direction and at an acute angle to the longitudinal axis of the pipe length, at least the male thread extending to a position adjacent a complementary stop shoulder on the other portion, characterised in that the or each complementary stop shoulder comprises a recess in the form of a cone having a rounded apex, the recess being adapted to sealingly receive a head in the form of a cone having a rounded apex with a radius marginally greater than the radius of the recess thereby providing a sealing surface with improved stress dispersal properties upon application of a torque to the joint.

The wall of the cone on the in-use outer surface of the male screw-threaded portion preferably subtends an angle of from 28 to 36° to the longitudinal axis of the pipe. Particularly preferably the wall of the cone subtends an angle of from 30 to 33° to the longitudinal axis of the pipe, and most preferably an angle of 30°.

The corresponding cone wall on the female threaded portion preferably subtends an ankle of from 28–38° with the longitudinal axis of the male threaded portion. The angle subtended by the cone wall of the female threaded portion is preferably greater than that subtended by the cone wall of the male threaded portion.

The male screw threaded portion preferably comprises a stress dispersing surface connecting the stop-shoulder to the first thread of the pin. The stress dispersing surface preferably describes a concave curve.

The radius of curvature of the concave curve of the stress dispersing surface is preferably from 0.075 to 0.085 cm, and is most preferably 0.081 cm.

The male screw threaded portion preferably comprises an end-shoulder which subtends an angle of from 14–24° with the plane perpendicular to the longitudinal axis of the pipe. The end-shoulder preferably subtends an angle of from 18–20°. It particularly preferably subtends an angle of 20°.

The end-shoulder of the female threaded portion preferably subtends an angle of 12–24°. With the plane perpendicular to the longitudinal axis of the male threaded portion. The angle subtended is conveniently from 14–18°. The angle subtended by the end-shoulder of the female threaded portion is preferably less than that subtended by the end-shoulder of the male threaded portion.

When the connection is axially compressed, the male screw threaded portion has a tendency to bulge inwards due to inwardly directed radial forces generated by the compression. The deformation thus caused is often known as barrel deformation.

Advantageously the in-use inner surface of the stop-shoulder is preferably concave to reduce the effects of barrel deformation. The radius of the concave surface is preferably from 4.9 to 5.2 cm, and most preferably 5.1 cm.

BRIEF DESCRIPTION OF THE DRAWINGS

The invention will now be described more particularly with reference to the accompanying drawings which show, by way of example only two embodiments of a screw-thread connector for a pipe. In the drawings.

DETAILED DESCRIPTION OF THE DRAWINGS

Figure 1:
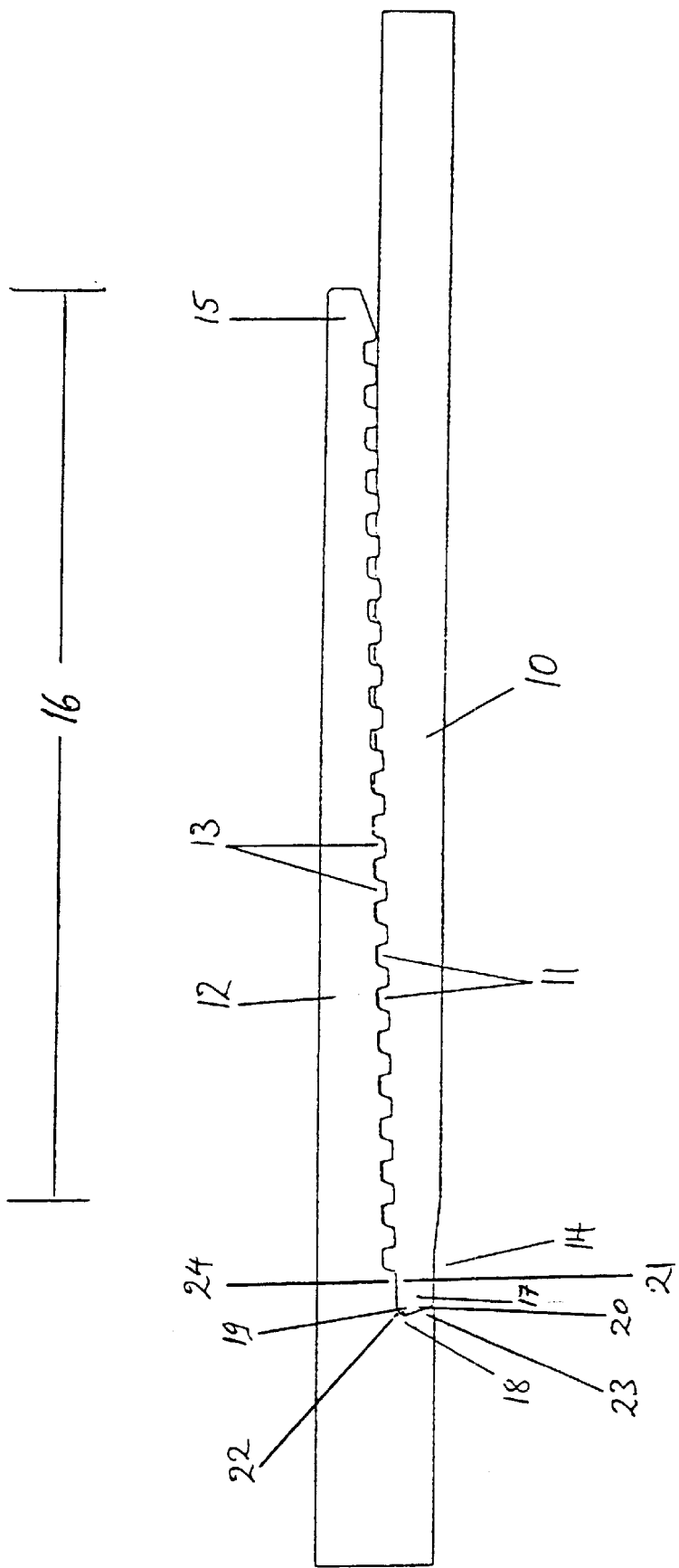
FIG. 1 is an axial sectional view of the screw-thread connection between a pin and a box.

Referring initially to FIG. 1, a pin 10 comprising a screw-thread 11, is threadably engaged with a box 12 having a corresponding screw-thread 13. The engagement of the pin 10 with the box 12 forms a joint. The pin 10 and the box 12 are tapered towards their respective ends 14, 15 such that the total width of the pipe wall in the region 16 remains substantially constant. A stop-shoulder 17 on the pin 10, engages a corresponding stop-shoulder 18 on the box 12 to form a seal.

In use the two screw-threads 11, 13 are engaged by application of a torque to the two pipes, until the seal is formed by contact between the surfaces 19, 20, 21 of stop-shoulder 17, with the surfaces 22, 23, 24 respectively of the stop-shoulder 18.

Figure 2:
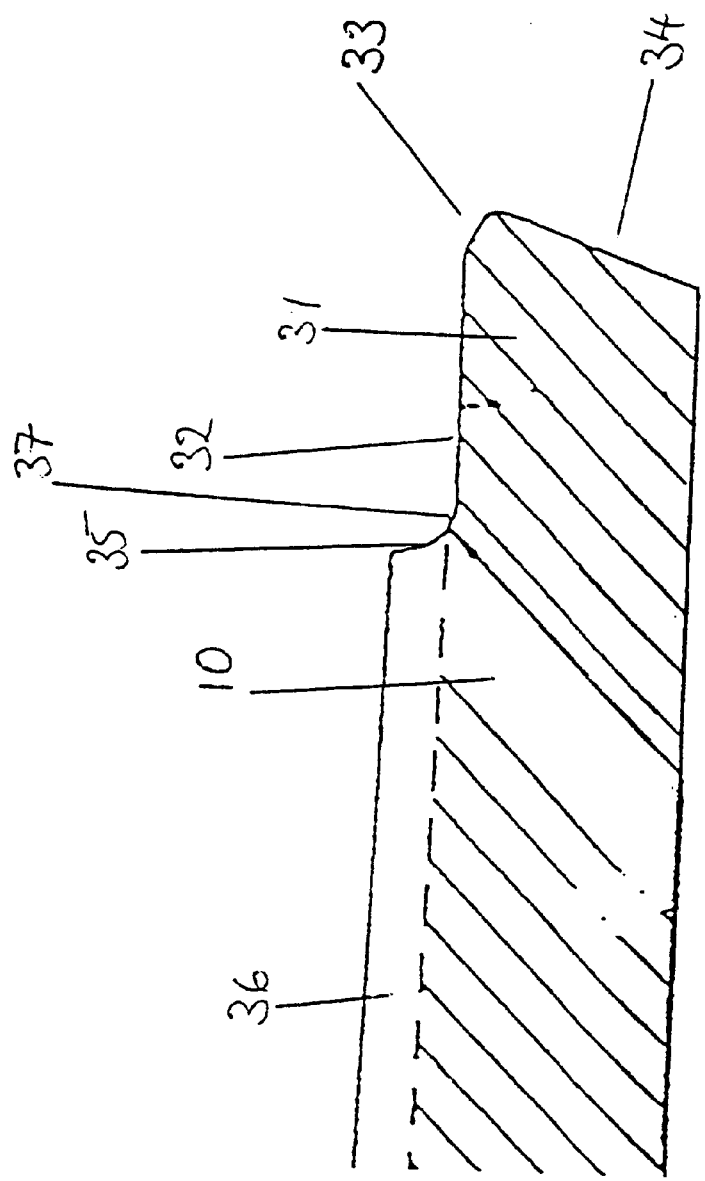
FIG. 2 is a larger scale axial sectional view of the stop-shoulder of the pin of FIG. 1.

The stop-shoulder of the pin 10 is illustrated in more detail in FIG. 2. The pin 10 has at one end a substantially frusto-conical stop-shoulder 31. The stop-shoulder 31 has a number of surfaces 32, 33, 34 which engage the corresponding stop shoulder of the box. Between the surface 33 and the end-shoulder 34 the stop shoulder is curved, having a radius of curvature of 0.036 cm. The surface 33 subtends an angle of 30° with the longitudinal axis of the pin 10. Furthermore, the end-shoulder 34 subtends an angle of 20° with the plane perpendicular to the longitudinal axis of the pin 10. The stop shoulder comprises a head portion, the head portion having a conical cross-section with a curved apex, the conical section being defined by side walls 33 and 34.

The surface 37 which connects the wall 35 of the thread 36 to the surface 32 is curved. The surface 37 has a radius of curvature of 0.081 cm.

Figure 3:
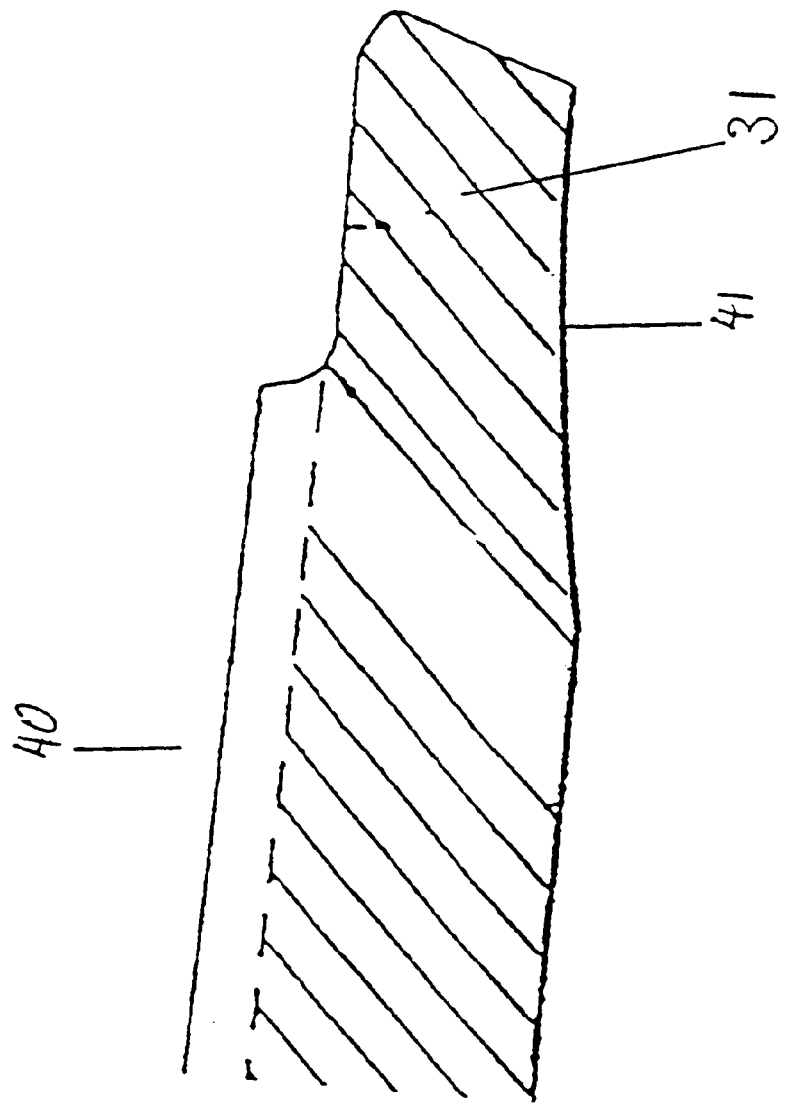
FIG. 3 is an axial sectional view of a second embodiment of the stop-shoulder of a pin.

FIG. 3 shows a further embodiment of the pin described above in FIG. 2. In this embodiment, the pin 40 comprises a further curved surface 41, having a radius of curvature of 5.08 cm. The curvature is such that when a torque is applied to the pin 40 whilst connecting it to a box, the stress induced by the torque causes an inward radial force to bend the pin 40 so that the surface 41 becomes flush with the box. In this way, flow of a fluid through the pipe is not disrupted by projections or discontinuities in the pipe.

Such disruption, perhaps resulting in vortices within the fluid flow results in more energy being required to transport the fluid alone the pipe. Furthermore, discontinuities are usually more vulnerable than other parts of a surface to chemical or physical attack from the transported fluid, with the result that they are more labile towards corrosion by the fluid.

Figure 4:
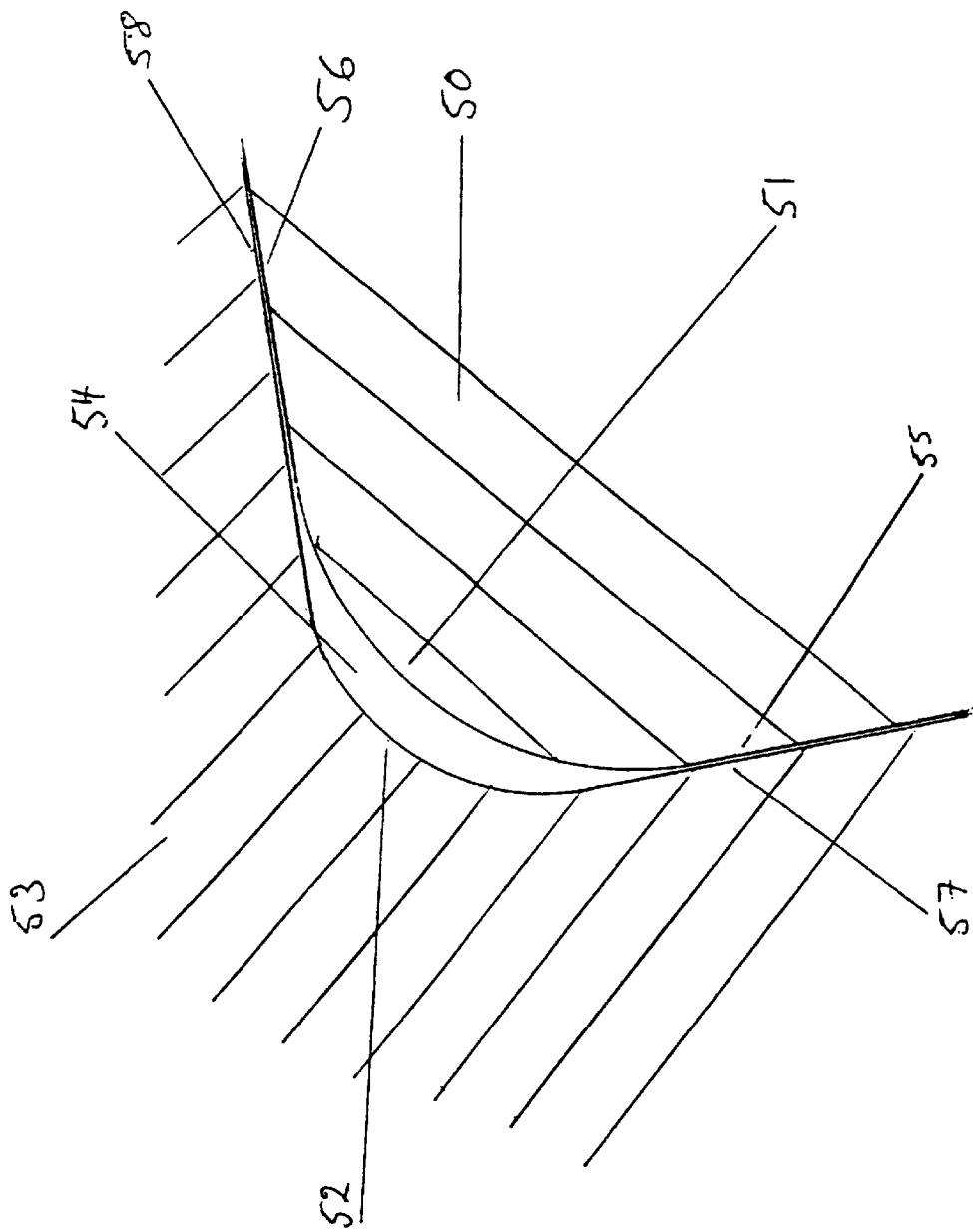
FIG. 4 is an axial sectional view of a pin and box joint.

FIG. 4 illustrates a further aspect of a pin and box joint according to the present invention. Surface 51 of the pin 50 has a radius of curvature of 0.036 cm. This radius of curvature is greater than that of the corresponding curve surface 52 on the box 53, which has a radius of curvature of 0.030 cm. The resulting gap 54, caused by the difference in curvature can be utilised during the coupling process. As surfaces 51 and 52 do not come into contact with each other until the pin and box are correctly engaged, stress in these regions is kept to a minimum for as long as possible. Once the pin 50 and box 53 are correctly engaged, as further torque is applied, the material from which the pipe is formed can begin to experience plastic flow due to the high strain to which it is subjected. The gap 54 can be utilised by allowing material undergoing such plastic forces to flow into it. Apart from this improving the seal, the flowing of the material into an empty space does not set up any additional strains in the box or pin. This would normally be the case should the shoulder of the pin not be able to flow fairly freely. A further advantage of the difference in curvature is that it can allow more easily, inward movement of the sealing region of the joint, which again reduces unnecessary stress.

The features described above can either individually or in conjunction with one another, reduce areas of high stress normally encountered within a stop-shoulder when the pipe on which it is located is connected to a second pipe. The features allow the energy transferred to the stop-shoulder on application of the torque to be dissipated more widely along the stop-shoulder region, and into the thread region.

Although not wishing to be limited by any particular theory it is believed that incorporation of the features discussed herein redistributes stresses brought about by the application of torque to the joint. Approximately 80–95% of the stress is concentrated in the sealing area of the coupling. The energy being stored in this region reduces unwanted plastic yielding of the material from which the pipes are formed.

Moreover, as a result of consistent control of the interference throughout the thread, particularly on the root of the pin, the crest of the coupling and the load flanks and with the improved seal geometry, the connection can receive a higher torque, which in turn improves the compression performance of the connection.

Although as illustrated in FIG. 4, the walls 55, 56 of the pin are parallel to and define the same angle as the walls 57, 58 of the box this need not be the case, and in many embodiments of the invention a different angle is advantageous. For example in a preferred embodiment (not illustrated), the surface of the female threaded portion corresponding to the surface 33 in FIG. 2 subtends an angle of 32° and that surface corresponding to the shoulder 34, subtends an angle of 18°.

In general the surface 33 can subtend an angle of from 28–36° with the longitudinal axis of the longitudinal axis of the pipe, whilst the corresponding surface on the female threaded portion can subtend an angle of from 28–38°.

Similarly, the shoulder 34 can subtend an angle of from 14–24° with the plane perpendicular to the longitudinal axis of the pipe, whilst the corresponding shoulder on the female threaded portion can subtend an angle of from 12–24°.

The difference in the angles reduces the bending stress in the seal area on application of a torque, and allows the energy of the torque to be used in a more efficient way.

The stop-shoulders as disclosed herein can be employed when forming pipes from many industry standard materials.

The pipes are typically be formed from steel. The grade of steel used for the pipe can be selected from those normally used in the pipeline industry. For example the following may be cited as suitable for use in the invention,—using standard nomenclature—K55, J55, N80, L80, C90, C95, P110 and Q125. The pipes may also be subject to anti-galling surface treatment prior to their being used.

The overall width of the pipe is typically from 3.8 cm to 12.7 cm in total diameter. It is more typically from 6.0 cm to 11.5 cm.

It will of course be understood that the invention is not limited to the specific details described herein, which are given by way of example, and various modifications and alterations are possible within the scope of the invention

What is claimed is:

1. A screw-threaded joint for pipes comprising a first pipe length having a male screw threaded portion at one end and a second pipe length having a female portion at one end, the end having a complementary screw thread, the threads being adapted to inter-engage along a greater part of the axial length thereof the threads being inclined in the same direction and at an acute angle to the central longitudinal axis of the joint, the male thread extending at least to a stop shoulder having a head portion which is positioned adjacent a complementary stop shoulder on the female portion, characterised in that the complementary stop shoulder comprises a cone receiver having a frusto-conical cross-section and a rounded receiver apex, the cone receiver adapted to sealingly receive the head portion which has a frusto-conical cross-section and rounded apex of radius greater than the radius of the apex of the cone receiver, thereby providing a sealing surface upon application of a torque to the joint and in that the in-use inner surface of the stop shoulder of the male screw-threaded portion is concave when viewed from the inside of the pipe.

2. A screw-threaded joint according to claim 1, characterised in that the in-use outwardly facing cone wall of the head portion subtends an angle of from 28 to 36° with respect to the longitudinal axis of the joint.

3. A screw-threaded joint according to claim 2, characterised in that the cone wall subtends an angle of from 30 to 33° with respect to the longitudinal axis of the joint.

4. A screw-threaded joint according to claim 1, characterized in that the in-use inwardly facing cone wall on the cone receiver subtends an angle of 28 to 38° with respect to the longitudinal axis of the joint.

5. A screw-threaded going according to claim 1, characterized in that the angle subtended by the in-use inwardly facing cone wall of the cone receiver is greater than that subtended by the in-use outwardly facing cone wall of the head position.

6. A screw-threaded joint according to claim 1, characterized in that the male screw-threaded portion comprises a second stress dispersing surface connecting the stop shoulder to the thread of the pipe.

7. A screw-threaded joint according to claim 6, characterised in that in cross-section the second stress dispersing surface describes a concave curve interacting longitudinally with the stop shoulder.

8. A screw-threaded joint according to claim 7 characterised in that the radius of curvature of the concave curve of the second stress dispersing surface is from 0.075 to 0.085 cm.

9. A screw-threaded join according to claim 8, characterised in that the radius of curvature of the concave surface of the second stress dispersing surface is from 0.081 cm.

10. A screw-threaded joint according to claim 1, characterized in that the male screw threaded portion comprises an end-shoulder which subtends an angle of from 14 to 24° with respect to the plane perpendicular to the longitudinal axis of the pipe.

11. A screw-threaded joint according to claim 10, characterised in that the end-shoulder subtends an angle of from 18 to 20° with respect to the plane perpendicular to the longitudinal axis of the pipe.

12. A screw-threaded joint according to claim 1, characterized in that the female threaded portion comprises and end-shoulder which subtends an angle of 12–24° with respect to the plane perpendicular to the longitudinal axis of the male threaded portion.

13. A screw-threaded joint according to claim 12, characterised in that the end-shoulder of the female threaded portion subtends an from 14 to 18° with a plane perpendicular to the longitudinal axis of the male threaded portion.

14. A screw-threaded joint according to claim 12, characterized in that the angle subtended by the end-shoulder of the female threaded portion is less than that subtended by the end-shoulder of the male threaded portion.

15. A screw-threaded joint according to claim 1, characterized the in-use inner surface of the stop shoulder of the male threaded portion is concave when viewed from the inside of the pipe.

16. A screw-threaded joint according to claim 15, characterised in that the radius of the concave surface is from 4.9 to 5.2 cm.

17. A screw-threaded joint according to claim 16, characterised in the radius of the concave surface is 5.1 cm.

* * * * *